(12) United States Patent
Fait

(10) Patent No.: US 9,157,413 B2
(45) Date of Patent: Oct. 13, 2015

(54) ARRAY OF BUOYS FOR OBTAINING ENERGY FROM A WAVE IN A BODY OF WATER

(71) Applicant: Mitchell Fait, Layton, UT (US)

(72) Inventor: Mitchell Fait, Layton, UT (US)

( * ) Notice: Subject to any disclaimer, the term of this patent is extended or adjusted under 35 U.S.C. 154(b) by 149 days.

(21) Appl. No.: 13/692,905

(22) Filed: Dec. 3, 2012

(65) Prior Publication Data

US 2014/0152014 A1 Jun. 5, 2014

(51) Int. Cl.
*F03B 13/14* (2006.01)
*F03B 13/20* (2006.01)

(52) U.S. Cl.
CPC . *F03B 13/20* (2013.01); *Y02E 10/38* (2013.01)

(58) Field of Classification Search
USPC ........ 290/53, 42; 60/495–498, 501, 502, 504, 60/505; 417/330–332
See application file for complete search history.

(56) References Cited

U.S. PATENT DOCUMENTS

| | | | | |
|---|---|---|---|---|
| 3,569,725 A | * | 3/1971 | Rosenberg | 290/53 |
| 4,792,290 A | * | 12/1988 | Berg | 417/332 |
| 7,872,363 B2 | * | 1/2011 | Morse | 290/42 |
| 2003/0137150 A1 | * | 7/2003 | Shu | 290/54 |
| 2008/0038061 A1 | | 2/2008 | Morse | |
| 2010/0019497 A1 | * | 1/2010 | Reiff | 290/53 |
| 2010/0084868 A1 | * | 4/2010 | Shin | 290/53 |
| 2011/0031753 A1 | * | 2/2011 | Moore et al. | 290/54 |
| 2011/0163547 A1 | | 7/2011 | Frishberg | |
| 2012/0248865 A1 | | 10/2012 | Eder et al. | |
| 2012/0261923 A1 | * | 10/2012 | Hassavari | 290/53 |

FOREIGN PATENT DOCUMENTS

JP 09242657 9/1997

* cited by examiner

*Primary Examiner* — Tulsidas C Patel
*Assistant Examiner* — Sean Gugger
(74) *Attorney, Agent, or Firm* — Thorpe North & Western LLP

(57) ABSTRACT

An array of buoys is disclosed for obtaining energy from a wave in a body of water. The array of buoys can include a framework having a plurality of vertical members and a base buoy coupled to the framework to support the framework in a body of water and maintain the vertical members in a vertical orientation. The array of buoys can further include a plurality of movable buoys. Each of the plurality of movable buoys can be movably disposed about a different one of the plurality of vertical members and configured to move relative to the respective vertical members and the base buoy in response to a wave in the body of water. Additionally, the array of buoys can include an energy conversion device operable with each of the plurality of movable buoys to generate power from movement of the movable buoys relative to the vertical members.

20 Claims, 7 Drawing Sheets

ARRAY OF BUOYS FOR OBTAINING ENERGY FROM A WAVE IN A BODY OF WATER

BACKGROUND

The ocean has great potential for generating usable energy if it can be harnessed efficiently. For example, there are a few ways that the ocean can be used to generate useable energy, e.g., use of ocean waves, use of ocean high and low tides, and/or use of temperature differences in the water. There are a few ocean energy power plants, but nothing on a very large scale. Regarding the use of ocean waves, it is known that such waves have a lot of kinetic energy, and this energy can be used to power various systems.

Although there are many systems for generating energy from the movement of ocean water, there is a continued need to find improvements in the way that this wave energy is harnessed.

SUMMARY

An array of buoys is disclosed for obtaining energy from a wave in a body of water, such as the deep ocean. The array of buoys can include a framework having a plurality of vertical members. The array of buoys can also include a base buoy coupled to the framework to support the framework in a body of water and maintain the vertical members in a vertical orientation. Furthermore, the array of buoys can include a plurality of movable buoys, wherein each of the plurality of movable buoys is movably disposed about a different one of the plurality of vertical members and configured to move relative to the respective vertical members and the base buoy in response to a wave in the body of water. Additionally, the array of buoys can include an energy conversion device operable with each of the plurality of movable buoys to generate power from movement of the movable buoys relative to the vertical members through the use of any technology known in the art for pumping water, pumping air, electromagnetic induction, or conversion through any other type of mechanical motion. In another example, a method for obtaining energy from a wave in a body of water can comprise obtaining an array of buoys as described herein, and disposing the array of buoys in the body of water.

DETAILED DESCRIPTION

Figure 1:
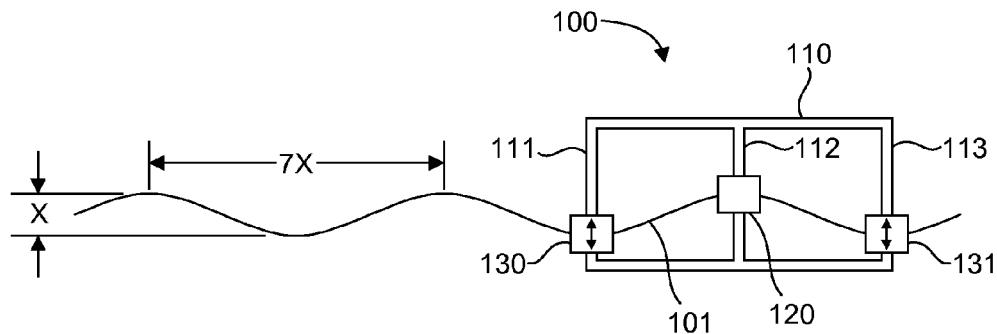
FIG. 1 illustrates an array of buoys for obtaining energy from a wave in a body of water, in accordance with an embodiment of the present disclosure.

Reference will now be made to the exemplary embodiments, and specific language will be used herein to describe the same. It will nevertheless be understood that no limitation of the scope of the disclosure is thereby intended. Alterations and further modifications of the inventive features illustrated herein, and additional applications of the principles of the disclosures as illustrated herein, which would occur to one skilled in the relevant art and having possession of this disclosure, are to be considered within the scope of the disclosure. It is also to be understood that the terminology used herein is used for the purpose of describing particular embodiments only. The terms are not intended to be limiting unless specified as such.

The singular forms "a," "an," and, "the" include plural referents unless the context clearly dictates otherwise. Thus, for example, reference to "a buoy" includes reference to one or more of such buoys, and reference to "the vertical member" includes reference to one or more of such vertical members.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

In accordance with these definitions and embodiments of the present disclosure, a discussion of the various systems and methods is provided including details associated therewith. This being said, it should be noted that various embodiments will be discussed as they relate to the systems and methods. Regardless of the context of the specific details as they are discussed for any one of these embodiments, it is understood that such discussion relates to other all other embodiments as well.

The present disclosure is drawn to an array of buoys for obtaining energy from a wave in a body of water. The array of buoys can include a framework having a plurality of vertical members. The array of buoys can also include a base buoy coupled to the framework to support the framework in a body of water and maintain the vertical members in a vertical orientation. Furthermore, the array of buoys can include a plurality of movable buoys, wherein each of the plurality of movable buoys is movably disposed about a different one of the plurality of vertical members and configured to move relative to the respective vertical members and the base buoy in response to a wave in the body of water. Additionally, the array of buoys can include an energy conversion device operable with each of the plurality of movable buoys to generate power from movement of the movable buoys relative to the vertical members.

In another embodiment, the disclosure provides a method for obtaining energy from a wave in a body of water. The method can comprise obtaining an array of buoys, the array of buoys including a framework having a plurality of vertical members, a base buoy coupled to the framework to support the framework in a body of water and maintain the vertical members in a vertical orientation, a plurality of movable buoys, wherein each of the plurality of movable buoys is movably disposed about a different one of the plurality of vertical members and configured to move relative to the respective vertical members and the base buoy in response to a wave in the body of water, and an energy conversion device operable with each of the plurality of movable buoys to generate power from movement of the movable buoys relative to the vertical members. Additionally, the method can comprise disposing the array of buoys in the body of water.

FIG. 1 shows an array of buoys 100 for obtaining energy from a wave 101 in a body of water. The array of buoys can include a framework 110 having a plurality of vertical members 111, 112, 113. The array of buoys can also include a base buoy 120 coupled to the framework to support the framework in the body of water and maintain the vertical members in a vertical orientation. In one aspect, the base buoy can be fixedly attached to the framework at or near a center of the framework, such as to a middle or primary column, to effectively support the framework in the water. The array of buoys can also include a plurality of movable buoys 130, 131, such that each of the plurality of movable buoys is movably disposed about a different one of the plurality of vertical members, such as an outer column, and configured to move relative to the respective vertical members and the base buoy in response to a wave in the body of water. In one aspect, the movable buoys can be configured to freely move or slide up and down relative to the vertical members and the base buoy. An energy conversion device can also be included and can be operable with each of the plurality of movable buoys to generate power from movement of the movable buoys relative to the vertical members.

It is noted that the embodiment shown in FIG. 1 as well as in FIGS. 2-4c hereinafter may or may not be inherently stable in the ocean, as additional stabilizing structures would typically be included to maintain the vertical members in a generally vertical configuration. These devices are shown in this manner without one or more of the many possible stabilizing structures that could be used in order to more clearly illustrate how the device functions at a basic level. Certain devices that may be more stable in the waves of the ocean are shown by example in FIGS. 7A-8B, and there are many other stable configurations that could likewise be devised that utilize the basic structure shown in FIGS. 1-4c. Furthermore, it is noted that the term "vertical" is defined as being generally vertical with respect to the construction of the framework as the device sits in the water. As waves pass by the device, the "vertical" members will not remain completely vertical at all times, but as mentioned, will be generally vertical in orientation.

Figure 2:
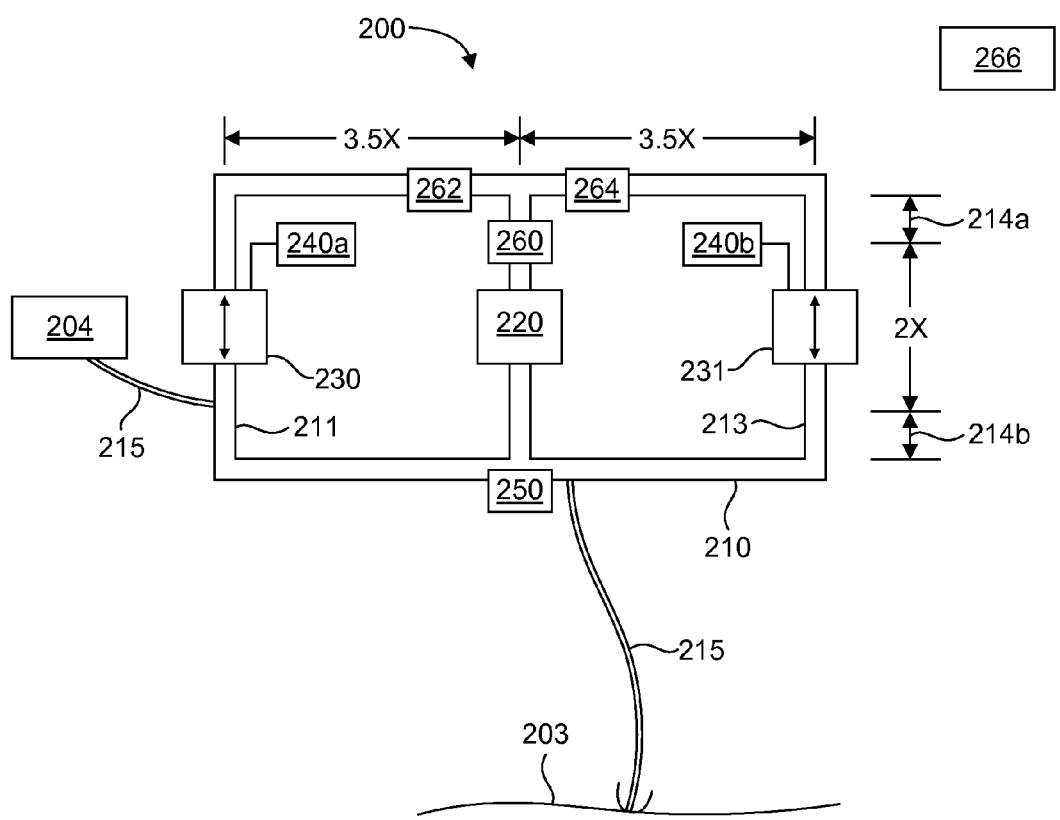
FIG. 2 illustrates an array of buoys for obtaining energy from a wave in a body of water, in accordance with another embodiment of the present disclosure.

With reference to FIG. 2, and continued reference to FIG. 1, an array of buoys 200 for obtaining energy from a wave in a body of water can be configured based on relationships to typical (design) wave expected to be encountered by the array of buoys. For example, it has been observed that typical deep water waves have a reasonably constant wave height and a wavelength relationship. Specifically, for a given wave height (X), the wave length is about seven times (7X) the wave height from peak to trough. In one aspect, the array of buoys can be designed for a specific wave height where the range of motion of the movable buoys relative to the vertical members is about two times (2X) the wave height. The base buoy can be configured to support the framework in the water to facilitate movement of the movable buoys up to two times the design wave height. In addition, the distance between the base buoy and a movable buoys can be from about two times the wave height (2X or 2:1 ratio) to about five times the wave height (5X or 5:1 ratio). In one particular aspect, the distance between the base buoy and a movable buoys is about three-and-a-half times the design wave (3.5X or 3.5:1 ratio). In this configuration, the base buoy can support the framework in the water such that the vertical floating movement of the movable buoys relative to the vertical members of the framework can move up to two times the design wave height.

The array of buoys can be used to obtain energy from water waves to produce energy through pumping water, pumping air, induction, or conversion through any other type of mechanical motion since each movable buoy can have attached to it an energy conversion device known in the art for converting mechanical motion into energy, such as a pump or electrical generator. It should be recognized that although the array of buoys can be designed for deep ocean water waves, other waves can alternatively be utilized.

In addition, each vertical member 211, 213 can have a height of two times (2X) the design wave height plus lengths 214a, 214b to accommodate variables such as the movable buoy height as well as a safety distance to provide additional clearance to minimize the chance of impact due to the fact that it is unlikely that each movable buoy will always float with the water exactly in the middle of the buoy height. Energy conversion devices 240a, 240b can be operable with the movable buoys 230, 231 to generate power from movement of the movable buoys relative to the vertical members.

A tether 215 can be coupled to the framework 210 to anchor the array of buoys 200 to an object, such as an ocean floor 203 or to an object 204 floating on a surface of the body of water such as a boat or oil rig. The tether can be configured to allow the array of buoys to move effectively in the water on the waves without permitting the array of buoys to stray too far from a desired location.

In one aspect, the array of buoys 200 can include a locomotion device 250 operable to move the array of buoys through the body of water. The locomotion device can be used to move the array of buoys to a desired location and/or to maintain the array of buoys at a desired position. For example, the locomotion device can be used to move the array of buoys from a deployment location, such as a dock, to a deep water location for harvesting energy. In one aspect, locomotion device can be also used to provide movement for a ship or other water vessel by coupling the array of buoys to the ship.

The array of buoys 200 can also include various systems useful for operating the array of buoys, such as a control system 260 operable to control operation of the array of buoys, a communication system 262 operable to communicate with a command center or base station, and/or a global positioning system (GPS) 264. For example, the control system can monitor various aspects of the array of buoys, such as the amount of energy generated. The communication system can communicate with a base 266, such as a command center located on land or on a ship. The GPS can monitor location of the array of buoys. Thus, the command center can receive data from the array of buoys as well as give operating instructions, such as a location to move to, etc. In response to such instructions, the locomotion device 250 can move the array of buoys to a location using the GPS for navigation.

The array of buoys 200 can be constructed of any suitable material. For example, typical structural materials suitable for marine use may be used, particularly those suitable for salt water applications when contemplating use in the ocean. In addition, the array of buoys can use hydrophobic materials on its surfaces so that any ice that forms during cold weather will shear and fall off the buoys and the framework as the array of buoys moves in the ocean, thereby preventing ice buildup.

Figure 3A:
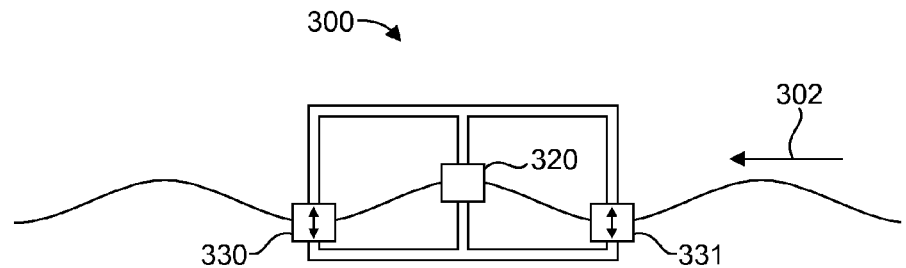
FIGS. 3A-3C illustrate an array of buoys in operation with waves of a typical or design size, in accordance with an embodiment of the present disclosure.
Figure 3B:
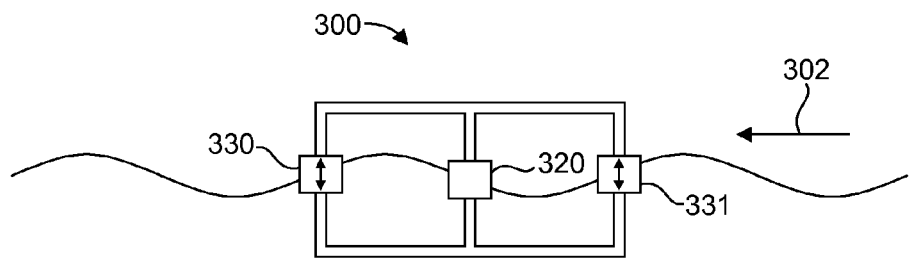
Figure 3C:
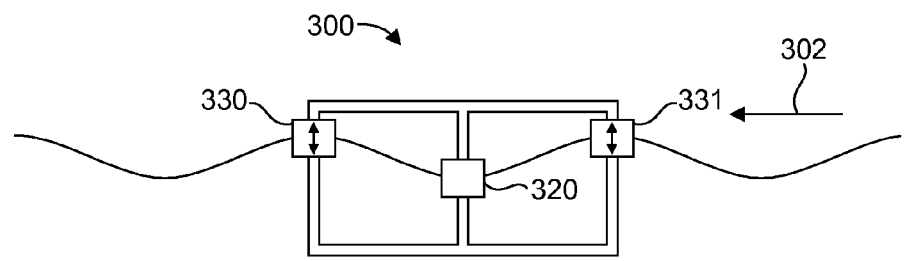

FIGS. 3A-3C illustrate an array of buoys 300 in operation with waves of a typical or design size. For example, as shown in FIG. 3A, the two movable buoys 330, 331 on opposite sides of the base buoy 320, at a distance from the base buoy as outlined above, are able to be at the lowest points, or troughs of a wave, while the base buoy 320 is at a highest point, or a crest of the wave. FIG. 3B shows the wave moving in direction 302 and causing the base buoy to fall off the crest while the movable buoys ride up out of the troughs toward crests. When the wave moves a distance of three-and-a-half wave heights, as shown in FIG. 3C, the movable buoys have switched vertical positions so that the movable buoys are at crests of a wave and the base buoy is at a trough. This creates a total vertical movement for each movable buoy along the vertical member associated with the movable buoy of two times the wave height.

Figure 4A:
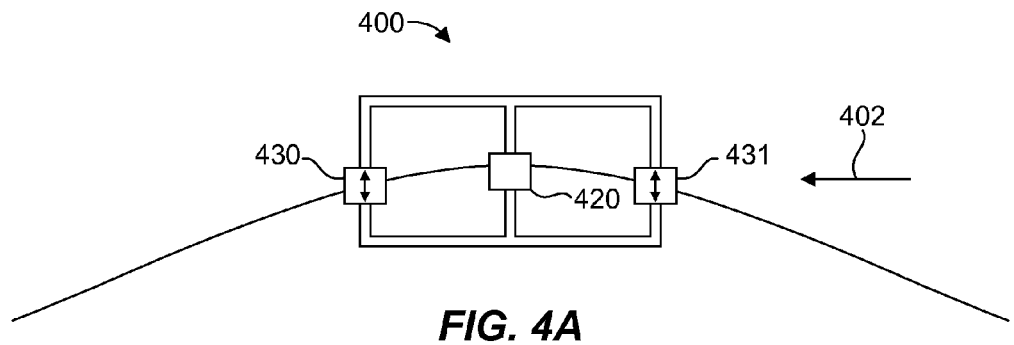
FIGS. 4A-4C illustrate an array of buoys in operation with waves that exceed a typical or design wave size, such as a rogue wave, in accordance with an embodiment of the present disclosure.
Figure 4B:
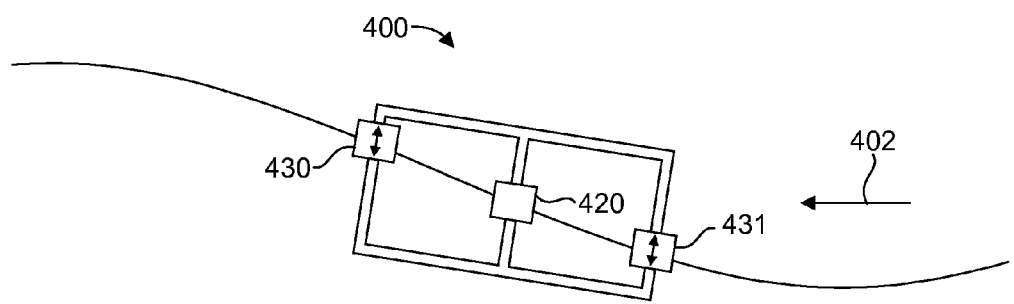
Figure 4C:
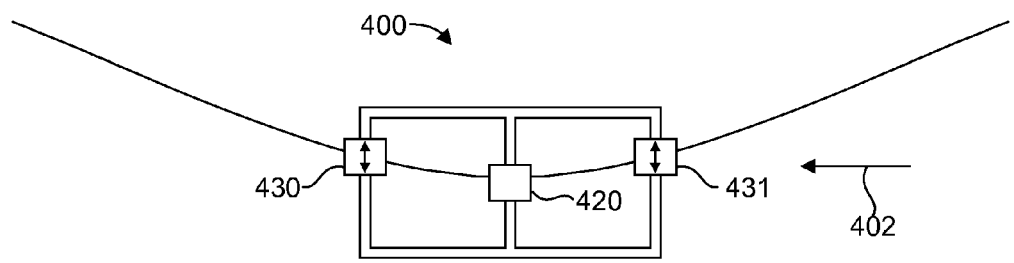

FIGS. 4A-4C illustrate an array of buoys 400 in operation with waves that exceed a typical or design wave size, such as a rogue wave. For example, as shown in FIG. 4A, the base buoy 420 lifts the entire array of buoys up on the crest of the wave, with the two movable buoys 430, 431 on opposite sides of the base buoy 420 on either side of the crest of the wave. FIG. 4B shows the wave moving in direction 402 and causing the array of buoys to fall off the crest of the wave. The movable buoys float on the wave such that movable buoy 430 tends to rise relative to the vertical member of the framework while movable buoy 431 tends to fall relative to the vertical member of the framework. In the event that the framework becomes unstable, the framework may tip causing the movable buoy to rise up the vertical member until it has reached the end of the range of motion, at which point it will prevent further tipping of the framework. Thus, the array of buoys can effectively ride up or down a large wave without tipping over. As shown in FIG. 4C, upon the base buoy reaching the trough of the wave, the movable buoys have moved up relative to the vertical members. The array of buoys can operate in any size wave by riding the slope of the wave and can therefore keep operating through hurricanes and tsunamis without damage. No matter how high the waves get, the buoys can keep floating and move without collision or damaging movement. No braking method or stop motion is required for extremely large ocean waves.

The array of buoys can produce the same amount of energy whenever the ocean waves are higher than or equal to the designed wavelength for the array. This permits a system to be designed for a specific capacity without wide fluctuations in performance as long as the actual wave height is greater than or equal to the wave height for which the array 1 has been designed. Such attributes are attractive for using an array of buoys as primary power, replacing nuclear, petroleum, natural gas, or coal plants. There is no need to vary the size of the framework to accommodate ocean depth differences which impacts other ocean wave devices which are attached to the ocean floor. Every device can be the same, thereby creating cost savings and improving manufacturability. In addition, because the entire array of buoys floats, operation in deep ocean waves is enabled. This allows placement of the device far from land so that deep ocean waves, which are larger than those close to shore, can be harvested for energy, and avoids cluttering the coastal waterways or taking up real estate used for tourism.

Figure 5:
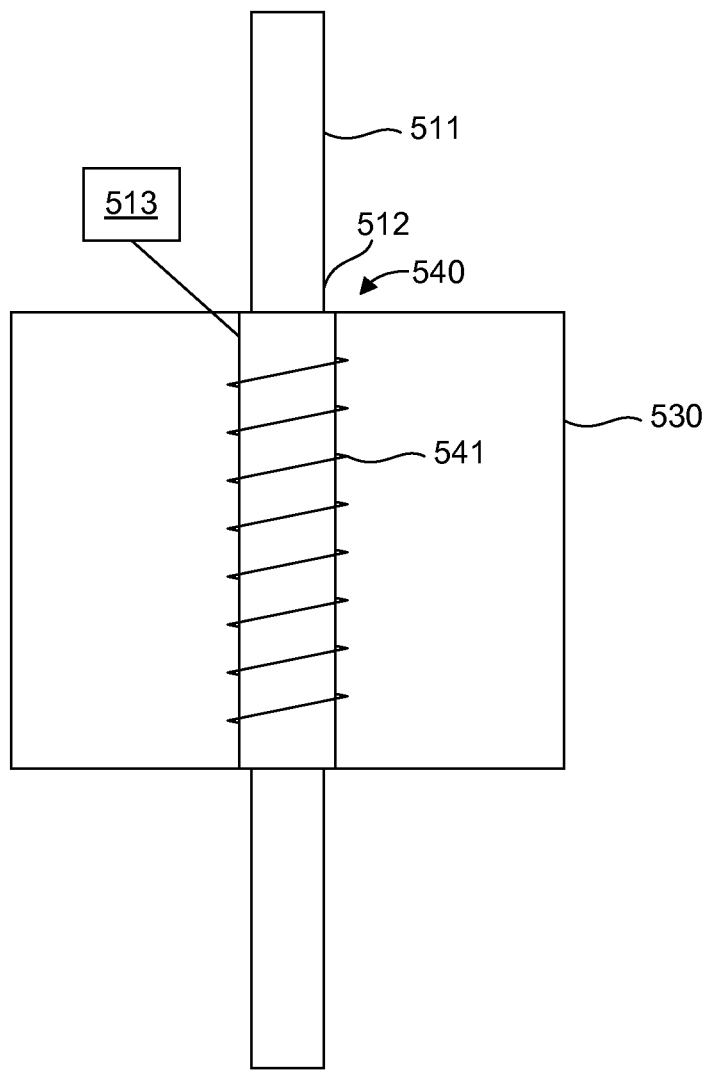
FIG. 5 illustrates an energy conversion device that is operable with a movable buoy to generate power from movement of the movable buoy, in accordance with an embodiment of the present disclosure.

FIG. 5 illustrates an example of an energy conversion device 540 that is operable with a movable buoy 530 to generate power from movement of the movable buoy relative to a vertical member 511. In this example, the energy conversion device comprises an inductor that generates electricity via electromagnetic induction. The inductor includes a coil 541 of conducting material, such as copper wire. The vertical member 511 includes a ferromagnetic or ferrimagnetic material within the range of motion of the movable buoy to form a core 512 for the inductor. Thus, relative motion of the movable buoy causes the coil to move relative to the core and generating electricity. The electricity can be used or stored, indicated at block 513, as desired.

Figure 6:
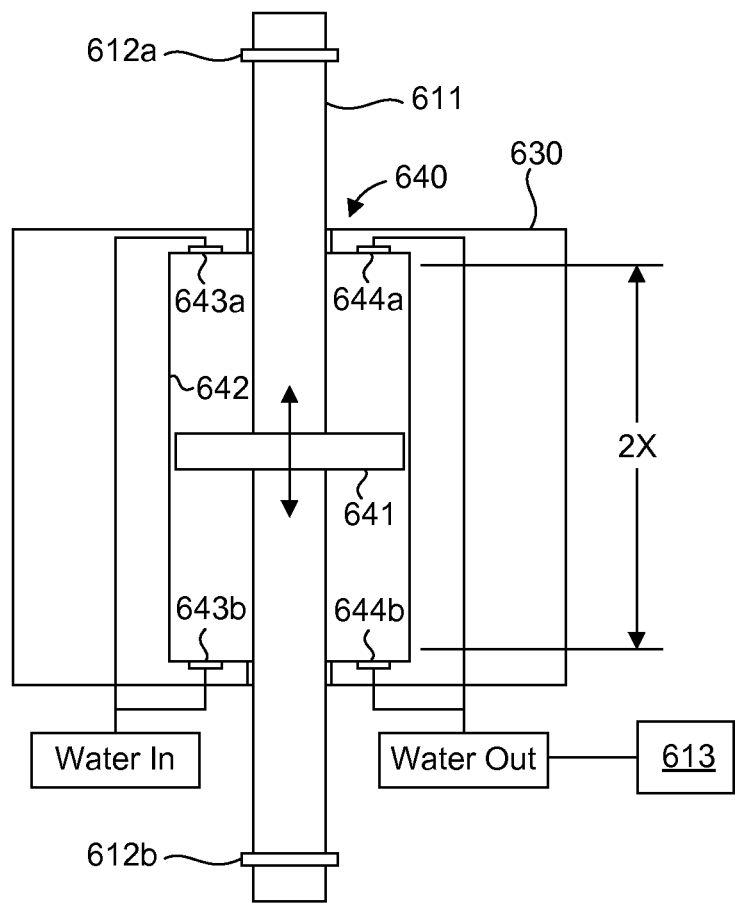
FIG. 6 illustrates an energy conversion device that is operable with a movable buoy to generate power from movement of the movable buoy, in accordance with another embodiment of the present disclosure.

FIG. 6 illustrates another example of an energy conversion device 640. In this example, the energy conversion device comprises a pump that utilizes a piston 641 coupled to a vertical member 611 that moves within a cylinder 642 associated with a movable buoy 630. The pump includes one-way inlet valves 643a, 643b and outlet valves 644a, 644b to regulate the flow of water through the pump. The pump can be configured to have a maximum stroke of two times the design wave height, which can be limited by stops 612a, 612b on the vertical member. Thus, relative motion of the movable buoy causes the piston to move relative to the cylinder and pumping water. The pumped water can be used to generate electricity, to turn a propeller for locomotion of the array of buoys, to provide water pressure for locomotion via water jets, to pump water out of flood zones for hurricane protection, or any other suitable use as desired, indicated at block 613.

For the hydroelectric generation of energy, water can be pumped from one or more arrays of buoys to a floating hydroelectric generator or pumped to a land-based hydroelectric generator. Water can be pumped up into a floating water tower (so that many small pumps can pump water without working against each other) to provide water pressure for the hydroelectric generator. This option would, for example, allow the quick conversions of troubled or deficient energy sources, to ocean wave energy. For example, many nuclear reactors are built close to the coast. For these reactors, water from ocean waves can be pumped to turn existing generators which were initially designed to be run by steam produced by a nuclear reactor. These generators can be converted to run as a result of pumped water. For desalination plants, water can be pumped from one or more arrays of buoys to a reverse osmosis plant to create fresh water from salt water. Also, the array of buoys can be used to provide remote power to oil rigs, undeveloped areas, and locations where disaster relief is needed.

It is noted that if the desire is to pump water using the systems and methods described herein, a combination of an electricity generator (as in FIG. 5) can be used to generate electricity by induction, and the electrical power can be used to run a conventional water pump. This may be a more simple way of moving water, rather than having more complicated pistons, one way valves, etc., described with respect to FIG. 6.

Figure 7A:
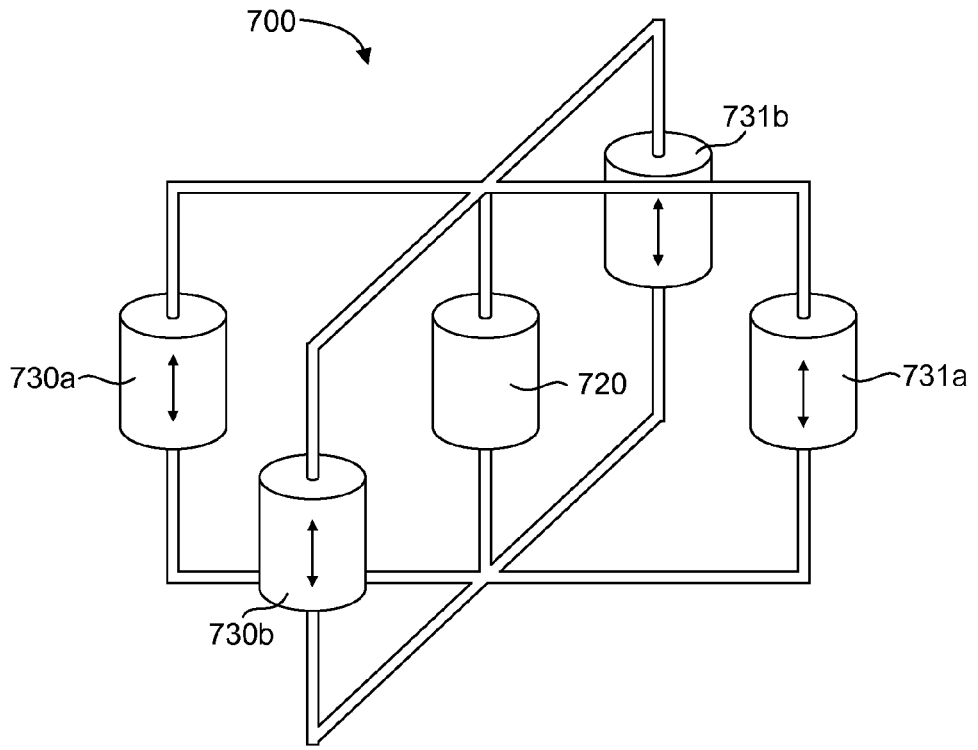
FIGS. 7A and 7B illustrate a cross configuration for maintaining stability of an array of buoys in the water, in accordance with an embodiment of the present disclosure.
Figure 7B:
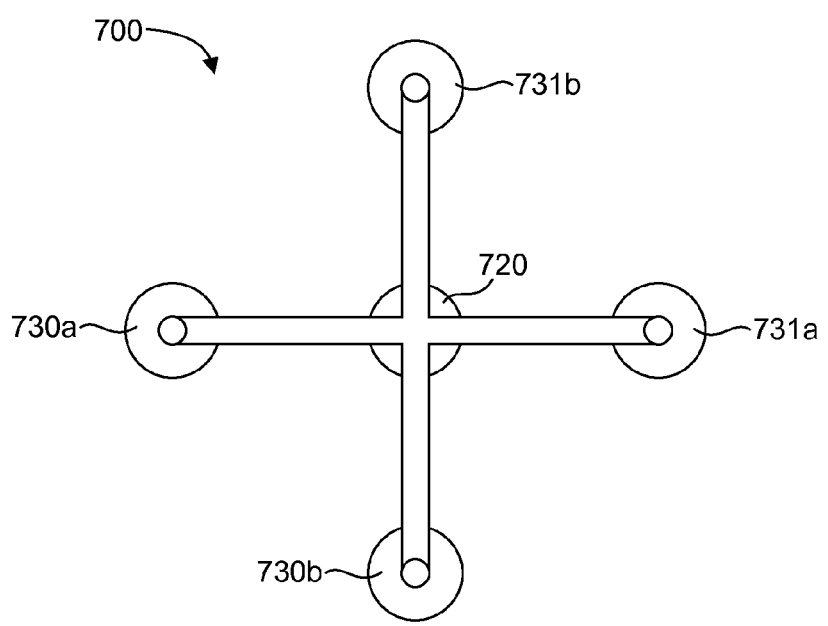

FIGS. 7A and 7B illustrate a cross configuration for maintaining stability of an array of buoys 700 in the water. Here, the base buoy 720 and the plurality of movable buoys 730a, 731a, 730b, 731b are arranged in a cross configuration with the base buoy disposed at a center of the cross configuration. The cross configuration locates movable buoys extending out in four opposite directions from the base buoy to provide floatation stability for the array of buoys. The cross configuration also enables energy harvesting vertical motion of the movable buoys from waves encountering the array of buoys from multiple directions.

Figure 8A:
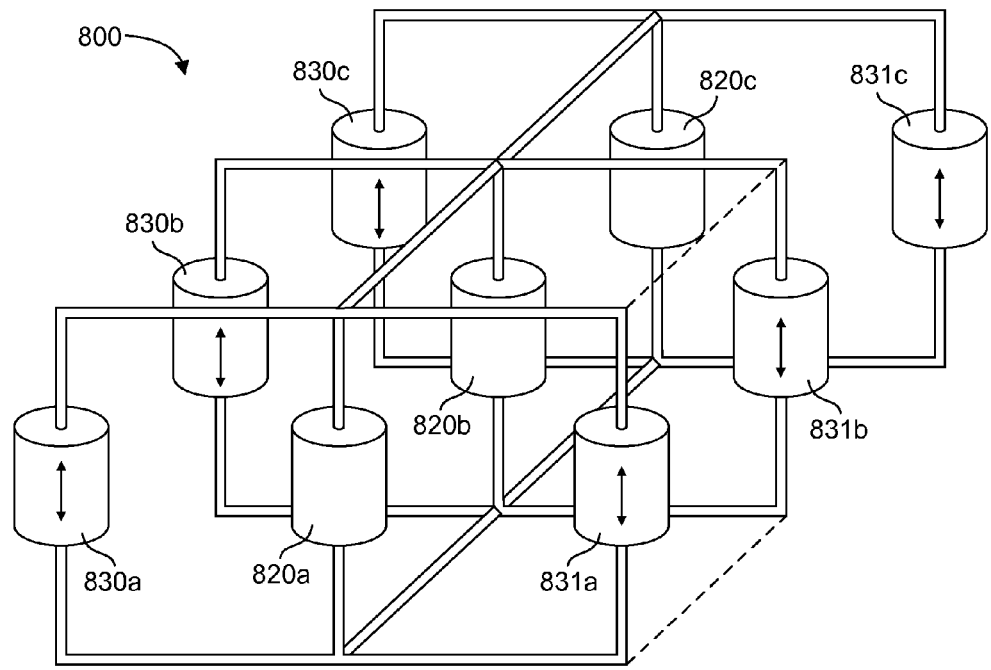
FIGS. 8A and 8B illustrate a configuration for maintaining stability of an array of buoys in the water as well as for extending the array to include any number of movable buoys and/or base buoys, in accordance with an embodiment of the present disclosure.
Figure 8B:
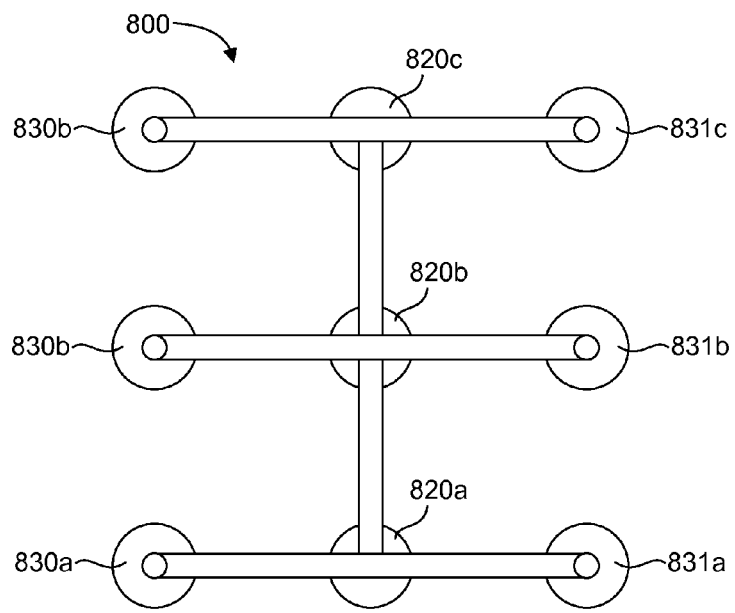

FIGS. 8A and 8B illustrate a configuration for maintaining stability of an array of buoys 800 in the water as well as for extending the array to include any number of movable buoys and/or base buoys. For example, a base buoy 820a can be associated with one or more movable buoys 830a, 831a in a positional relationship as disclosed herein. This basic arrangement can be repeated any number of times to expand or enlarge the array, as illustrated with base buoys 820b and 820c, and movable buoys 830b, 831b and 830c, 831c, respectively. The base buoys can serve as stabilizing buoys for the array. The base buoys can be connected by one or more framework members, such as lateral members 816a, 816b. Alternatively, or in addition, the base buoys can be connected by one or more lateral framework members 817a, 817b that extend between framework portions proximate to movable buoys. In one aspect, the lateral framework members connecting base buoys can form rigid connections or pivoting connections. A pivoting connection may result in reduced stress on the framework as an array grows in size by allowing the base members to move relative to one another to follow a wave without suspending a base member in the air above the water. In this case, a range of motion for a pivoting connection can be limited to prevent the framework from folding up and collapsing or damaging components of the array. It should be appreciated that the various components of an array of buoys can be arranged to provide stability and/or expand the number of base buoys and/or movable buoys in the array utilizing the concepts and positional relationships disclosed herein.

In a related embodiment, a method for obtaining energy from a wave in a body of water in accordance with the principles herein is disclosed. The method comprises obtaining an array of buoys, the array of buoys including a framework having a plurality of vertical members, a base buoy coupled to the framework to support the framework in a body of water and maintain the vertical members in a vertical orientation, a plurality of movable buoys, wherein each of the plurality of movable buoys is movably disposed about a different one of the plurality of vertical members and configured to move relative to the respective vertical members and the base buoy in response to a wave in the body of water, and an energy conversion device operable with each of the plurality of movable buoys to generate power from movement of the movable buoys relative to the vertical members. Additionally, the method comprises disposing the array of buoys in the body of water.

In one aspect, the method further comprises causing the array of buoys to move through the body of water. In another aspect, the method further comprises tethering the array of buoys to an object. It is noted that no specific order is required in this method, though generally in one embodiment, these method steps can be carried out sequentially.

Of course, it is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An array of buoys for obtaining energy from a wave in a body of water, comprising:
   a framework having a plurality of vertical members;
   a base buoy coupled to the framework to support the framework in a body of water and maintain the vertical members in a vertical orientation;
   a plurality of movable buoys, wherein each of the plurality of movable buoys is movably disposed about a different one of the plurality of vertical members and configured to move relative to the respective vertical members and the base buoy in response to a wave in the body of water, and wherein two of the plurality of movable buoys are disposed on opposite sides of the base buoy; and
   an energy conversion device operable with each of the plurality of movable buoys to generate power from movement of the movable buoys relative to the vertical members,
   wherein a ratio of a lateral distance between one of the plurality of movable buoys and the base buoy to a range of motion of the one of the plurality of movable buoys relative to the respective vertical member is from about 1:1 to about 5:2.

2. The array of buoys of claim 1, wherein at least one of the energy conversion devices generates electricity.

3. The array of buoys of claim 2, wherein at least one of the energy conversion devices generates electricity via electromagnetic induction.

4. The array of buoys of claim 1, wherein at least one of the energy conversion devices comprises a pump.

5. The array of buoys of claim 1, further comprising a tether coupled to the framework to anchor the array of buoys to an object.

6. The array of buoys of claim 5, wherein the tether anchors the array of buoys to an ocean floor.

7. The array of buoys of claim 5, wherein the tether anchors the array of buoys to an object floating on a surface of the body of water.

8. The array of buoys of claim 7, wherein the object floating on the surface of the body of water comprises a boat or an oil rig.

9. The array of buoys of claim 1, wherein the ratio of the lateral distance between the one of the plurality of movable buoys and the base buoy to the range of motion of the one of the plurality of movable buoys relative to the respective vertical member is about 3.5:2.

10. The array of buoys of claim 1, further comprising a control system operable to control operation of the array of buoys.

11. The array of buoys of claim 1, further comprising a communication system operable to communicate with a base station.

12. The array of buoys of claim 1, further comprising a global positioning system.

13. The array of buoys of claim 1, further comprising a locomotion device operable to move the array of buoys through the body of water.

14. The array of buoys of claim 1, wherein the base buoy and the plurality of movable buoys are arranged in a cross configuration with the base buoy disposed at a center of the cross configuration.

15. The array of buoys of claim 1, wherein the base buoy comprises a plurality of base buoys, each base buoy being associated with at least one of the plurality of movable buoys.

16. A method for obtaining energy from a wave in a body of water, comprising:
   obtaining an array of buoys, the array of buoys including:
   a framework having a plurality of vertical members,
   a base buoy coupled to the framework to support the framework in a body of water and maintain the vertical members in a vertical orientation,
   a plurality of movable buoys, wherein each of the plurality of movable buoys is movably disposed about a different one of the plurality of vertical members and configured to move relative to the respective vertical members and the base buoy in response to a wave in the body of water, and wherein two of the plurality of movable buoys are disposed on opposite sides of the base buoy, and
   an energy conversion device operable with each of the plurality of movable buoys to generate power from movement of the movable buoys relative to the vertical members,
   wherein a ratio of a lateral distance between one of the plurality of movable buoys and the base buoy to a range of motion of the one of the plurality of movable buoys relative to the respective vertical member is from about 1:1 to about 5:2; and
   disposing the array of buoys in the body of water.

17. The method of claim 16, further comprising causing the array of buoys to move through the body of water.

18. The method of claim 16, further comprising tethering the array of buoys to an object.

19. The array of buoys of claim 1, wherein the base buoy is fixedly attached to the framework.

20. An array of buoys for obtaining energy from a wave in a body of water, comprising:
   a framework having a plurality of vertical members;
   a base buoy coupled to the framework to support the framework in a body of water;
   a plurality of movable buoys laterally positioned relative to the base buoy, wherein each of the plurality of movable buoys is movably disposed about a different one of the plurality of vertical members and configured to move relative to the respective vertical members and the base buoy in response to a wave in the body of water; and
   an energy conversion device operable with each of the plurality of movable buoys to generate power from movement of the movable buoys relative to the vertical members,
   wherein a ratio of a lateral distance between one of the plurality of movable buoys and the base buoy to a range of motion of the one of the plurality of movable buoys relative to the respective vertical member is from about 1:1 to about 5:2.

\* \* \* \* \*